United States Patent
Pfeifer et al.

(10) Patent No.: US 7,096,736 B2
(45) Date of Patent: Aug. 29, 2006

(54) PASSIVE TIRE PRESSURE SENSOR AND METHOD

(75) Inventors: Kent Bryant Pfeifer, Los Lunas, NM (US); Robert Leslie Williams, Albuquerque, NM (US); Robert Lee Waldschmidt, Calgary (CA); Catherine Hook Morgan, Ann Arbor, MI (US)

(73) Assignee: The Goodyear Tire & Rubber Company, Akron, OH (US)

( * ) Notice: Subject to any disclaimer, the term of this patent is extended or adjusted under 35 U.S.C. 154(b) by 383 days.

(21) Appl. No.: 10/633,774

(22) Filed: Aug. 4, 2003

(65) Prior Publication Data

US 2005/0028595 A1   Feb. 10, 2005

(51) Int. Cl.
*G01L 7/08* (2006.01)
(52) U.S. Cl. ......................................... 73/715
(58) Field of Classification Search ............... 73/700, 73/703, 723, 715; 310/313; 333/193
See application file for complete search history.

(56) References Cited

U.S. PATENT DOCUMENTS

| | | | | |
|---|---|---|---|---|
| 4,454,440 | A * | 6/1984 | Cullen | 310/313 R |
| 4,994,798 | A * | 2/1991 | McColl | 333/195 |
| 5,528,452 | A | 6/1996 | Ko | 361/283.4 |
| 6,003,378 | A * | 12/1999 | Scherr et al. | 73/703 |
| 6,777,855 | B1 * | 8/2004 | Bergmann et al. | 310/313 B |
| 6,810,750 | B1 * | 11/2004 | Kiefer et al. | 73/801 |
| 2002/0078757 | A1 * | 6/2002 | Hines et al. | 73/727 |
| 2002/0121132 | A1 | 9/2002 | Breed et al. | 73/146 |
| 2004/0246076 | A1 * | 12/2004 | Bergmann | 333/193 |

FOREIGN PATENT DOCUMENTS

DE   244818   4/1987

OTHER PUBLICATIONS

Pohl., A. et al: Wirelessly Interrogable Passive SAW Sensors, Application for Permanent Monitoring of Tire Pressure, VDI Berichte, Duesseldorf, DE, Oct. 23, 1997, pp. 305-318, XP009007706, ISSN: 0083-5560.

Scholl, G. et al: Wireless Passive SAW Sensor Systems for Industrial and Domestic applications, Frequency Control Symposium, 1998. Proceedings of the 1998 IEEE International Pasadena, CA, USA May 27-29, 1998, New York, NY, USA IEEE, US, May 27, 1998, pp. 595-601, XP010305563 ISBN: 0-7803-4373-5.

Steidl, R. et al: "Impedance Loaded SAW-Sensors Offer a Wide Range of Measurement Opportunities", Microwave Symposium Digest, 1999 IEEE MIT-S International Anaheim, CA, USA Jun. 13-19, 1999, Piscataway, NJ, USA, IEEE, US, Jun. 13, 1999, pp. 1453-1456, XP010343666 ISBN: 0-7803-5135-5.

* cited by examiner

*Primary Examiner*—Edward Lefkowitz
*Assistant Examiner*—Andre Allen
(74) *Attorney, Agent, or Firm*—Richard B. O'Planick

(57) ABSTRACT

A surface acoustic wave device includes a micro-machined pressure transducer for monitoring tire pressure. The device is configured having a micro-machined cavity that is sealed with a flexible conductive membrane. When an external tire pressure equivalent to the cavity pressure is detected, the membrane makes contact with ridges on the backside of the surface acoustic wave device. The ridges are electrically connected to conductive fingers of the device. When the detected pressure is correct, selected fingers on the device will be grounded producing patterned acoustic reflections to an impulse RF signal. When the external tire pressure is less than the cavity reference pressure, a reduced reflected signal to the receiver results. The sensor may further be constructed so as to identify itself by a unique reflected identification pulse series.

20 Claims, 4 Drawing Sheets

PASSIVE TIRE PRESSURE SENSOR AND METHOD

The U.S. Government has certain rights in this invention as provided for by the terms of Contract No. DE-AC04-94AL85000 awarded by the U.S. Department of Energy. The Government has certain rights in the invention.

FIELD OF THE INVENTION

The invention relates generally to air pressure monitoring devices and, more specifically, to passive tire pressure monitoring devices and systems and method for utilization of same.

BACKGROUND OF THE INVENTION

Safe, efficient and economical operation of a motor vehicle depends, to a significant degree, on maintaining correct air pressure in all (each) of the tires of the vehicle. Operating the vehicle with low tire pressure may result in excessive tire wear, steering difficulties, poor road-handling, and poor gasoline mileage, all of which are exacerbated when the tire pressure goes to zero in the case of a "flat" tire.

The need to monitor tire pressure when the tire is in use is highlighted in the context of "run-flat" or extended mobility tires, tires which are capable of being used in a completely deflated condition. Such run-flat tires, as disclosed for example in U.S. Pat. No. 5,368,082, incorporated herein by reference, may incorporate reinforced sidewalls, mechanisms for securing the tire bead to the rim, and a non-pneumatic tire within the pneumatic tire to enable a driver to maintain control over the vehicle after a catastrophic pressure loss, and have evolved to the point where it is becoming less and less noticeable to the driver that the tire has become deflated. The broad purpose behind using run-flat tires is to enable a driver of a vehicle to continue driving on a deflated pneumatic tire for a limited distance prior to repair of the deflated tire. Hence, it is generally desirable to provide a low tire pressure warning system within the vehicle to alert the driver by way of a light or an audible alarm to the loss of air pressure in a pneumatic tire. In a general sense, such a warning system may also be utilized to identify the particular tire experiencing the loss of air pressure and trigger automatic means for tracking the mileage that the tire has been driven in the deflated condition.

To this end, a number of electronic devices and systems are known for monitoring the pressure of pneumatic tires and providing the operator of the vehicle with either an indication of the current tire pressure or alerting the operator when the pressure has dropped below a predetermined threshold level. It is also known to monitor tire pressure with an electronic device that is not merely a passive resonant circuit, but rather is capable of transmitting a radio frequency (RF) signal indicative of the tire pressure to a remotely-located receiver. Such a "transmitting device" may have its own power supply or, alternatively, may be activated by an RF signal from the remote receiver. In the latter form, the transmitting device is said to be "passive".

A typical tire monitoring system will have a receiver with one or more antennas for receiving signals from the tags in each of the tires on the vehicle. The tags may be packaged and mounted within the tire cavity or, alternatively mounted to the valve stem in communication with the tire cavity. In order to report tire conditions that are properly identified with each of the tires on the vehicle, the monitoring system receiver must be able to determine from which tire the received RF signals originates. It is known, accordingly, to incorporate within each tag a unique identifying code (ID) and to configure the tag to include its ID within a data stream transmitted by the tag.

Various means for measuring air pressure are utilized within known tire pressure monitoring systems. It is known, as in U.S. Pat. No. 4,578,992, to use a pressure-sensitive capacitor forming a passive oscillatory circuit having a resonant frequency which varies with tire pressure. Other suitable pressure transducers known in the art include piezoelectric devices; silicon capacitive pressure transducers; variable-conductive laminates of conductance ink; and devices formed of a variable-conductance elastomeric composition. While functionally adequate in theory, such devices are relatively costly, and are less than satisfactory because of the difficulty in calibrating the devices and accurately and predictably measuring analog frequency or voltage variations. In addition, such known devices, in association with electronic circuitry for transmitting pressure data, have been plagued by difficulties inherent in the tire environment. Such difficulties include effectively and reliably coupling RF signals into and out of the tire, the rugged use the tire and electronic components are subjected to, as well as the possibility of deleterious effects on the tire from incorporation of the pressure transducer and electronics in a tire/wheel system. In the context of passive RF transponders that are powered by an external reader, another problem is generating predictable and stable voltage levels within the transponder so that the circuitry within the transponder can perform to its design specification.

It is further known to incorporate within surface acoustic wave (SAW) devices a programmable reflection pulse sequence by adding several sets of additional conductive stripes and then selectively floating and grounding them. A surface acoustic wave is reflected by any acoustic impedance discontinuity that it encounters in its path. By grounding the inter-digitated transducer on the surface of the device (i.e. in the path of the SAW wave), a change in the impedance discontinuity occurs and the acoustic reflection is increased. By electrically floating the inter-digitated transducer, the acoustic impedance discontinuity is reduced minimizing the acoustic reflection. Such devices are powered by an RF signal; data is stored on a read only memory (ROM); and the system is placed in position to be interrogated.

Such devices may have application, for example, in a high-speed rail traffic control system where a passing train interrogates a SAW device in the track as it passes. The reflection parameter from the SAW device is controlled by inputting the data stored on the ROM onto the reflection transducers. Thus, the reflection parameter signal is modulated as a function of time and the data is transferred thereby from the ROM via the SAW device to the train receiver. The data may describe the location and other information from the passive SAW device system to the train as it passes.

SUMMARY OF THE INVENTION

A radio frequency (RF) transponder as defined in one or more of the appended claims is capable of transmitting data related to a pneumatic tire and parameters, such as air pressure, associated with the pneumatic tire to an external reader. According to an aspect of the invention, the transponder is preferably passive, powered by an RF signal from the external reader. However, the principles of the invention are such that they may have benefit in non-tire applications or in applications providing localized transponder power.

According to an aspect of the invention, a surface acoustic wave (SAW) based pressure sensor employs a coding scheme to measure the tire pressure within a tire cavity and identify the individual tire. A system in the context of a tire application may consist of at least one active RF transmitter and at least one passive pressure sensor mounted on each tire. The SAW device is combined with a pressure transducer to form a passive pressure measurement sensor or device.

According to a further aspect of the invention, the sensor device includes a cavity that is sealed with a flexible conductive membrane and has a standard overpressure in the cavity. When an equal pressure is applied to the membrane, the membrane makes contact with at least one ridge on the backside of the SAW device. The ridge(s) are electrically connected to conductive fingers of the SAW device that are normally electrically floating. When the pressure is correct, selected fingers on the SAW device will be grounded producing patterned acoustic reflections to an impulse RF signal. If the pressure of the atmosphere (tire cavity pressure) is high enough to compress the gas inside the sealed cavity, the membrane will collapse onto the conducting mesas, shorting out the refection transducers accordingly.

According to a further aspect of the invention, the sensor device may be configured in a bi-stable mode or, alternatively, in a measurement mode for quantitatively measuring pressure. The device may further be configured to provide an identification signal responsive to an RF impulse signal, whereby the location of the pressure sensor may be determined.

According to yet a further aspect of the invention, A method for sensing pressure is achieved comprising the steps:
a. transmitting an acoustical wave across at least a surface portion of a sensor body;
b. positioning a reflection transducer to intercept the acoustical wave and reflect a signal back;
c. positioning a pressure transducer adjacent to the sensor body, the pressure transducer comprising a flexible conductive membrane, a cavity sealed by the membrane at a preset internal reference pressure;
d. deflecting the membrane into electrically contacting engagement with the reflection transducer responsive to the presence of a predetermined external pressure level;
e. modulating the signal reflected by the reflection transducer by electrical engagement between the reflection transducer and the deflected membrane.

The subject invention is representatively shown in a preferred embodiment that is described in detail below and illustrated by the accompanying drawings.

BRIEF DESCRIPTION OF THE DRAWINGS

The invention will be described by way of example and with reference to the accompanying drawings in which.

DETAILED DESCRIPTION OF THE PREFERRED EMBODIMENTS

Figure 1:
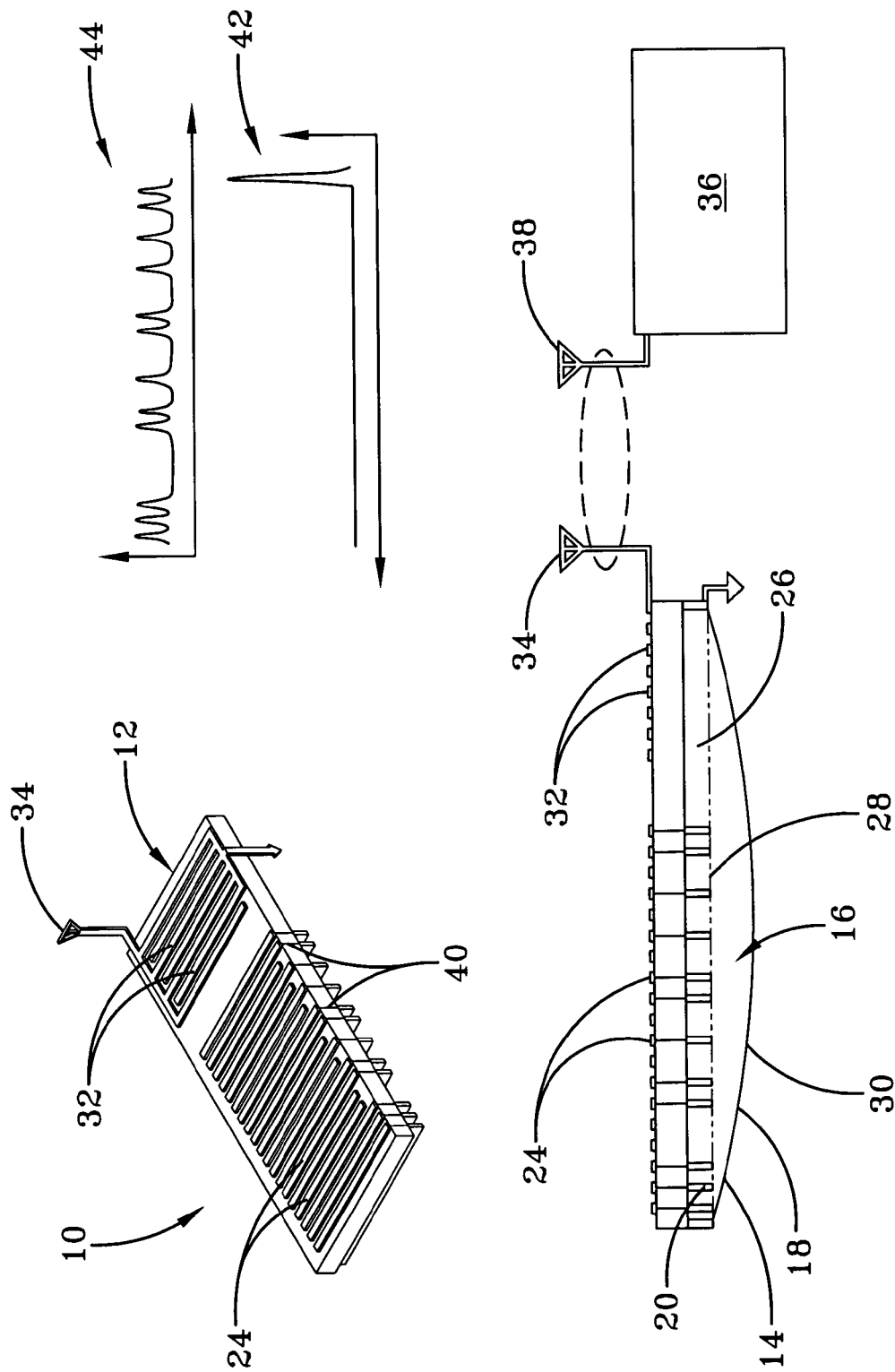
FIG. 1 is a schematic diagram of a SAW pressure transducer system and a plot of the input RF signal and responsive return RF signal.

Referring initially to FIG. 1, the subject invention proposes to produce an inexpensive, passive pressure measurement device 10 that combines a surface acoustic wave (SAW) device 12 with a micro-machined pressure transducer 14. The device 10 may be installed in a disposable valve stem (not shown) of a tire in a manner conventional to available pressure measuring devices. While the subject device 10 is particularly applicable to use in measuring the air pressure within a pneumatic tire, its utility is not to be so limited. Other applications requiring or benefiting from an inexpensive, pressure measuring device will find the present invention useful. In addition, while the preferred embodiment of the invention is intended to be passive; that is, powered by RF excitation from a transmitter/receiver as will be explained, the invention, again, is not intended to be so constrained. Use of the inventive principles herein set forth will also provide benefit in "active" sensor configurations wherein the device may be directly powered from a power supply.

With continued reference to FIG. 1, a micro-machined cavity 16 that is sealed with a flexible conductive membrane 18 and has a standard overpressure in the cavity $P_o$. One of multiple acceptable values for $P_o$, for the purpose of illustration, is 35 psi. The membrane 18 may be formed of any suitable flexible, conductive material. Without intent to limit the extent of suitable materials, one such material is thin poly-silicon. The membrane 18 is produced such that when an equal pressure is applied to the membrane, the membrane makes contact with several ridges 20 produced on the backside 22 of the SAW device. The ridges are electrically connected to conductive fingers 24 (also referred to as "reflection transducers") of the SAW device that are normally electrically floating. When the pressure is correct, selected fingers 24 of the SAW device will be grounded producing patterned acoustic reflections to an impulse RF signal. In FIG. 1, where Pa is the atmospheric pressure and $P_o$ is the pressure under which the transducer membrane is sealed, three membrane configurations 26, 28, 30 are shown for three conditions: $P_a = P_o$; $P_a > P_o$; and $P_a < P_o$. The value $P_o$ can be set at the nominal tire pressure or any other reference pressure.

As shown in FIG. 1, the device 10 is preferably constructed from a SAW device with a single set of interdigitated transducers (IDTs) 32 connected to an antenna 34. A narrow RF pulse is generated from a transmitter/receiver 36, transmitted by antenna 38 to SAW antenna 34, and converted into an acoustic pulse by the antenna/IDT by means of the piezoelectric strain placed on the substrate surface 32, 34. The pulse propagates to the left as viewed in FIG. 1. If the pressure of the atmosphere above the membrane is high enough to compress the gas inside the sealed cavity 16, the membrane 18 will collapse onto the conducting mesas or ridges 16, shorting out the reflection transducers 24. It will be noted from FIG. 1 that only several selected reflection transducers 40 are connected to the conducting mesas. This allows the designer to produce a sensor that reflects a unique identification pulse series. Thus, the sensor not only measures the pressure but also identifies itself by means of the identification pulse series unique to the sensor. FIG. 1 graphs the input pulse 42 and the unique reflected identification pulse series at 44.

When $P_a$ is less than the pressure $P_o$, the membrane 18 floats above the conducting mesas 20 resulting in reduced reflected signal to the receiver 36. Thus, the device 10 is also self-testing since the identification signal is only in place if the pressure is high enough. If the membrane or SAW device is defective there will be a reduced or zero reflected signal or an incorrect pattern from the device allowing the system to recognize a circuit failure. For the configuration shown in FIG. 1, the pressure is measured as either being greater than or equal to the set pressure $P_o$ or less than the set pressure. Such a bi-stable mode is accurate enough for many applications such as detecting sudden loss of tire pressure in automotive applications. The subject invention, therefore, can function as a digital on/off indicator that measures tire pressure against a reference membrane pressure and signals when the tire pressure falls below the threshold. Such a fall may be electronically interpreted as the occurrence of a "flat" condition and trigger the vehicle computer to begin tracking mileage. Providing a warning to the driver of the mileage driven on a tire in a "run-flat" mode may thus prevent the vehicle from being driven on a flat tire past the tire's designed run-flat limit.

Figure 2:
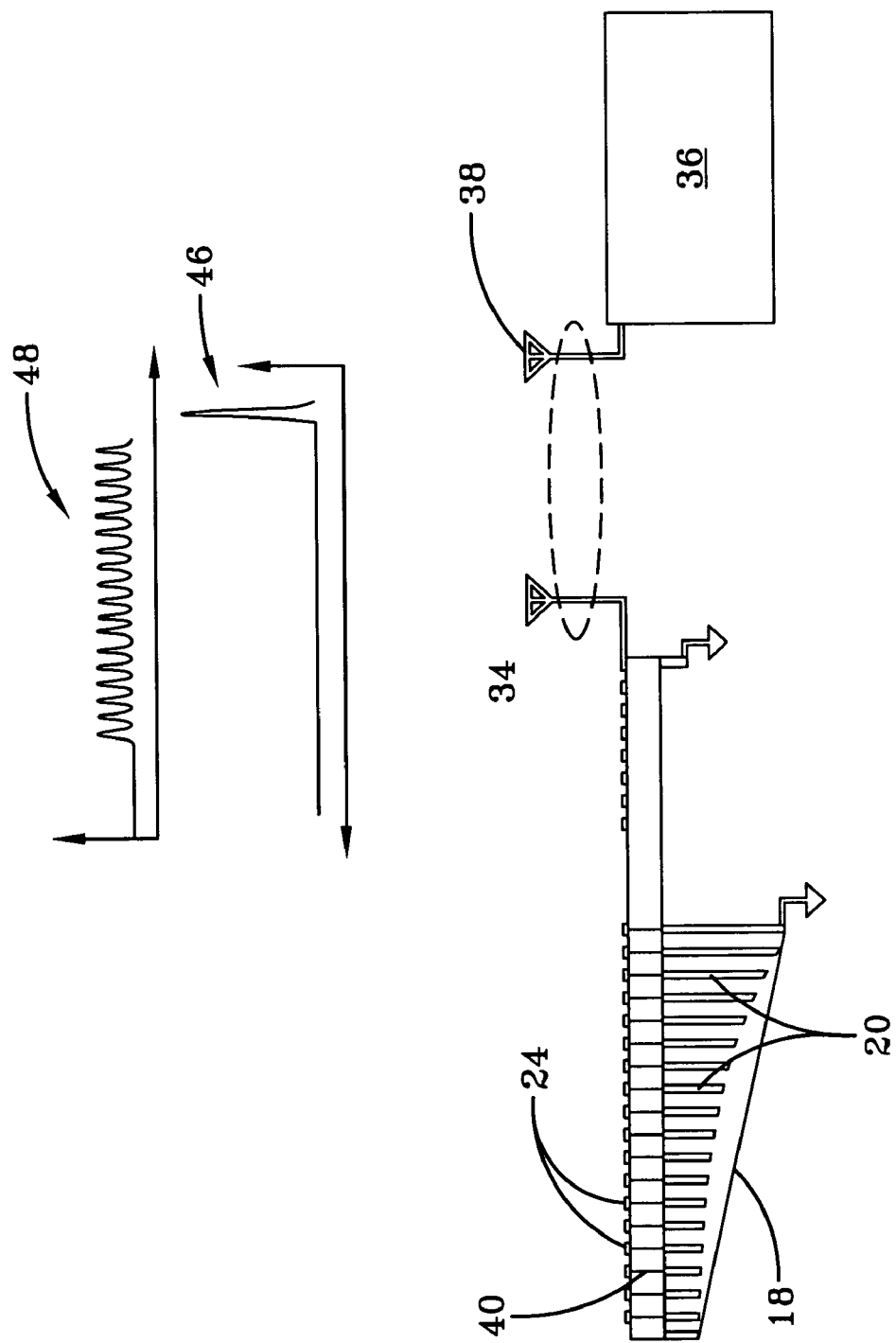
FIG. 2 is a schematic diagram of a SAW pressure transducer system configured to measure actual pressure external to the device.

For an application where the identification of the device is not required, the additional reflection transducers 24 can be used to return a measure of the pressure that is more resolved than in the bi-stable case described above, which is essentially on or off. This configuration is shown in FIG. 2 where the height of the conduction mesas 20 is set so that a fixed change in pressure will bring the membrane 18 in contact with an adjacent mesa. Thus, a given input RF pulse 46 will result in a signal 48 returned from the transducer. The number of returned pulses shown in return signal 48 is a measure of the atmospheric pressure above the sensor. The number of reflection transducers 24 and mesas 20 may be varied to fix the resolution of the device.

If there is no pre-tension in the membrane 18, the deflection of a point ($d_x$) of the membrane can be calculated from the following equation.

$$d_x = \frac{1}{2} \frac{P_a x}{E h^3}[a^3 - 2ax^2 + x^3] \quad (1)$$

where x is the position along the membrane as illustrated in FIG. 2, E is Young's modulus for the membrane material, h is the thickness of the membrane, and a is the length of the membrane. The height of the mesas may thus be calculated as a function of pressure allowing calibration of the gauge.

Figure 3:
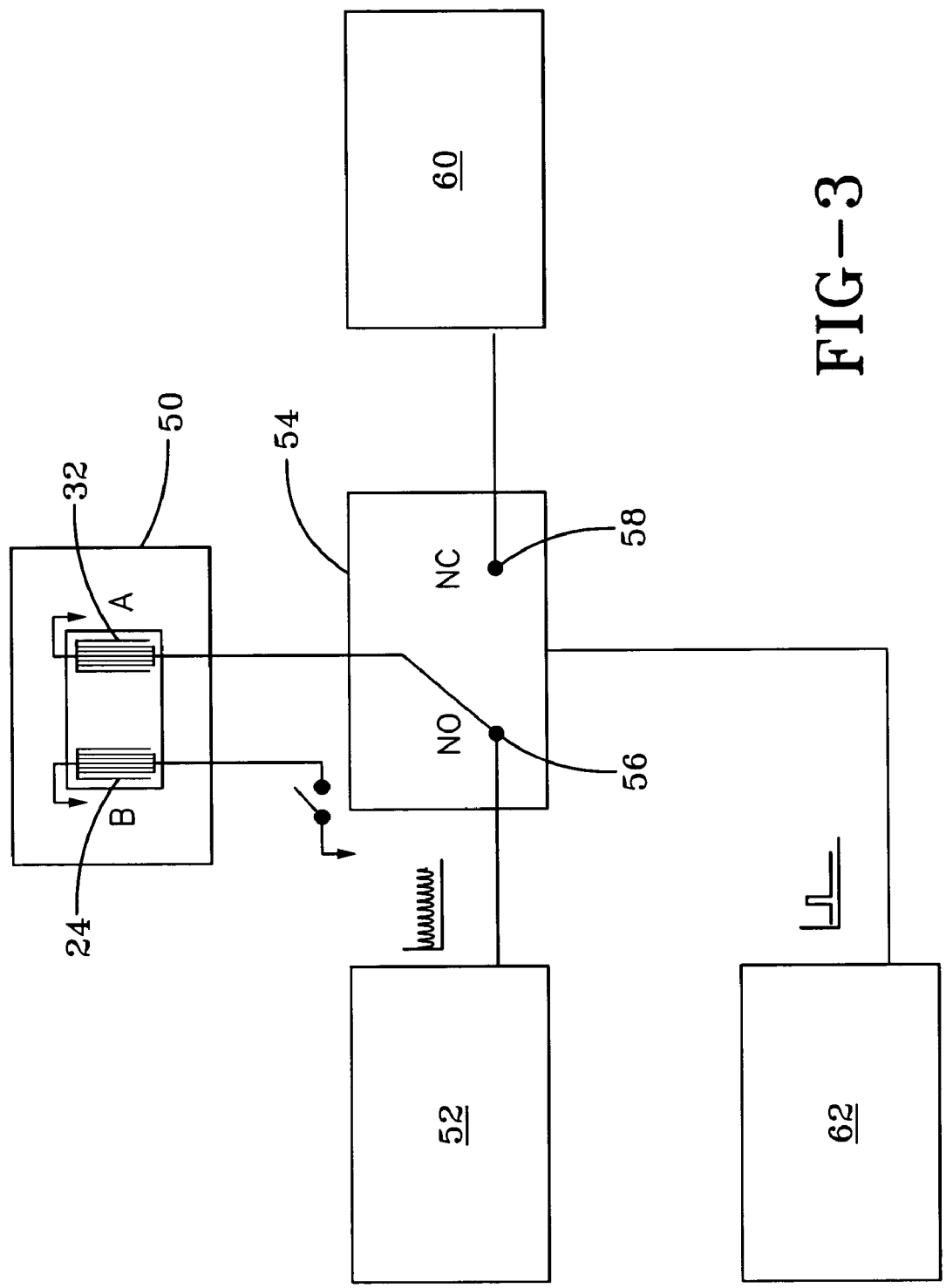
FIG. 3 is a schematic diagram of measurement apparatus for observing the reflection of the acoustic waves from the SAW device.

A functional system is shown in FIG. 3. A dual SAW device 50 is placed in a brass shielded fixture that allows connection to an RF synthesizer 52 (for example, synthesizer HP8657A sold by Hewlitt Packard Corporation) via the normally open side of a single-pole double-throw RF switch 54. The SAW device 50 may be optimized to function at 97 MHz, and the synthesizer 52 is set to produce a continuous signal at that frequency. The RF switch 54 (Mini Circuits model ZFSW-2-46) may be connected to the synthesizer 52 and to a pulse generator 62 (HP8082A) that closes the normally open side 56 of the switch 54 for approximately 0.1 μsec allowing a pulsed RF signal to reach the SAW device 50. The RF switch may then be returned to its normal position 58 allowing the reflected signal from the SAW device to be measured using an oscilloscope (HP54522A). The results of the measurement are shown in FIG. 4.

Figure 4:
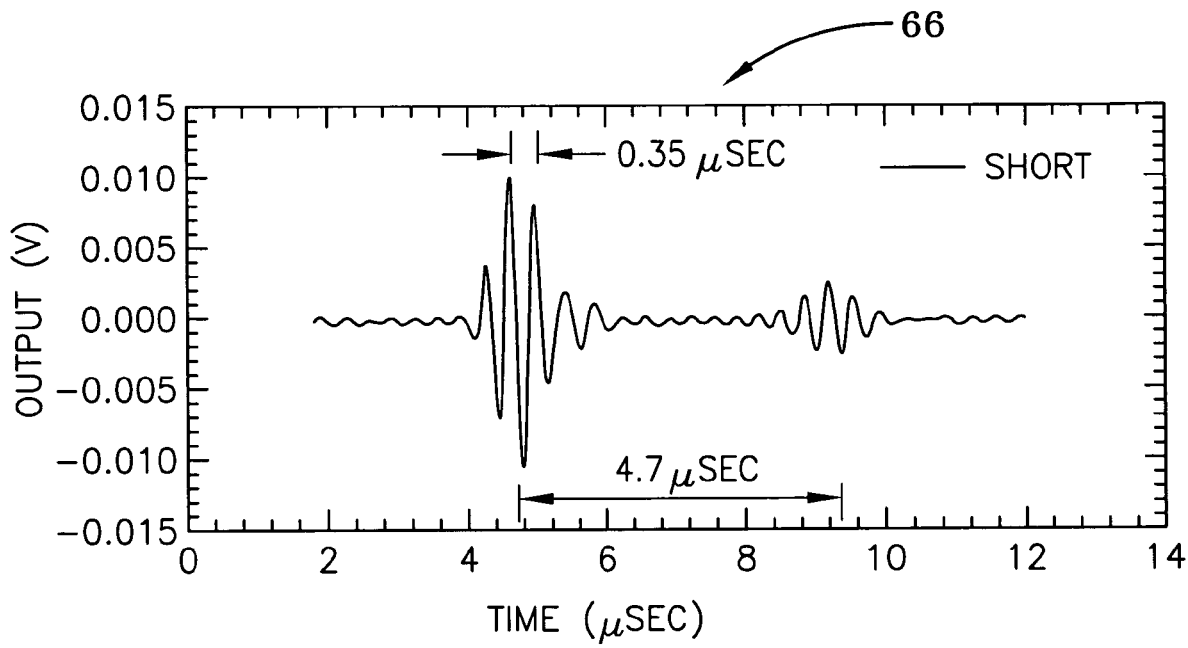
FIG. 4 is a plot of SAW reflection comparing a floating transducer with a grounded transducer.
Figure 4:
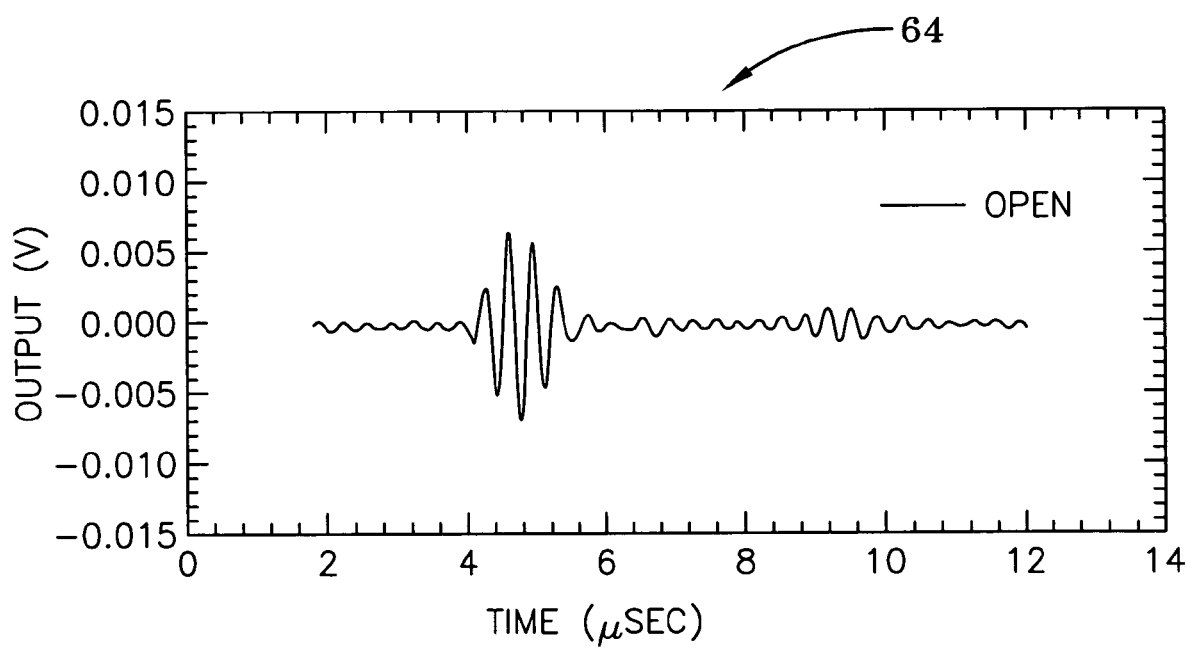

FIG. 4 is a plot of the reflection as a function of time from an input/output inter-digitated transducer 12 (IDT) with 8 μm wide traces and 8 μm wide spaces (32 μm acoustic wavelength). With reference to FIGS. 3 and 4, the launch transducer A is 5.7 μm from the reflection transducer B and the transducers are 1.6 mm wide (fifty (50) finger pairs*32 μm=1.6 mm) resulting in a double transit time of 4.7 μsec as is measured between the two principal reflection features seen in FIG. 4. In addition, the 0.35 μsec period oscillations observed are a result of the 97 MHz reflections being aligned with the sampling period of the oscilloscope. The envelopes are actually enclosing RF signals that have a period of 10 nsec that can be individually observed with a narrower time scale on the oscilloscope. In addition, the width of the envelope is 2.4 μsec, representing the length of time that an acoustic wave can travel 7.6 mm. Since there are no features on the SAW device that have dimensions of this order other than the spacing of the transducers, it may be concluded that standing waves are being excited in the resonant structure of the SAW device and they have a decay time of 2.4 μsec. The resonant structure of the device thus reduces the temporal resolution that can be obtained.

Comparing the amplitude of the envelope of the refection between the grounded transducer (plot 66) and the ungrounded transducer (plot 64) illustrates that the acoustic impedance of the grounded transducer is larger than the floating transducer resulting in more energy being reflected. The design of the subject transducer is not optimal since it has a resonant structure for the reflector as is shown in FIG. 4. Other designs, that will be apparent to those skilled in the art, may be devised to minimize or eliminate the resonant structure of the reflector.

Currently, small micro-machined pressure transducers exist commercially. Some, however, are based on films whose resistance changes as a function of stress due to the flexure of a membrane. Thus, they require sensitive electronics to measure the small current changes in the film and record the pressure. They further require connection to a source of electricity to function. Providing such a power source either requires a modification to the wheel hub, in the case of a rotating tire application, or a battery. However, batteries have limited lifetimes. The subject system eliminates such design obstacles. Energy transfer may be done via RF pulses since no active bias voltages are required in the rotating tire. Thus, the subject device is truly passive. In addition, the subject sensor is relatively inexpensive to fabricate and assemble in comparison with alternative systems and designs. The sensor may be mounted to the valve stem of a tire.

From the foregoing it will be appreciated that the invention overcomes deficiencies in the pressure systems currently available. The sensor can function in a true digital mode wherein the pressure of a tire can be sensed and compared against a preset threshold value (pressure within the membrane). Either the pressure within the tire is acceptable or it is not. The sensor can transmit not only the pressure status of the tire to its associate remote reader but can also transmit an identification sequence with which to specifically identify the tire. The problematic application of bias voltages required in alternative sensor designs is avoided. Consequently, not only is the sensor inexpensively and readily fabricated and assembled, but a system incorporating such sensors is less prone to pressure reading error from bias voltage variance.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pressure sensor comprising:
   (a) a surface acoustical wave conductive body having an input transducer disposed to transmit a directional acoustical wave across at least a surface portion of the body;
   (b) at least one reflection transducer disposed to receive and reflect the acoustical wave back as a reflected signal;
   (c) a pressure transducer disposed adjacent to the surface acoustical wave conducting body, the pressure transducer comprising a flexible conductive membrane;
   (d) a cavity sealed by the membrane at a preset reference pressure; and
   (e) the membrane deflecting responsive to a predetermined external pressure level to contact the reflection transducer and modulate the signal reflected by the reflection transducer.

2. A pressure sensor according to claim 1, wherein the reflection transducer comprises a plurality of conductive fingers disposed serially along the surface portion of the conductive body, the membrane deflecting responsive to the external pressure level to establish electrical contact with at least one conductive finger to modulate the signal reflected by the one conductive finger.

3. A pressure sensor according to claim 2, wherein the modulated signal from the one conductive finger identifies the pressure sensor.

4. A pressure sensor according to claim 1, wherein the reflection transducer is switched between an electrically floating state and an electrically grounded state through contact with the conductive membrane.

5. A pressure sensor according to claim 1, wherein the reflection transducer comprises a plurality of conductive fingers deployed along the conductive body, at least one conductive finger switching between an electrically floating state and an electrically grounded state through electrical contact with the conductive membrane.

6. A pressure sensor according to claim 5, wherein the extent of membrane deflection is determined by the external pressure level.

7. A pressure sensor according to claim 5, wherein a signal reflected from the one conductive finger is modulated from electrical contact with the conductive membrane.

8. A pressure sensor according to claim 7, wherein the one conductive finger of the plurality of conductive fingers that is contacted by the membrane is determined by the extent of membrane deflection.

9. A pressure sensor according to claim 8, wherein the extent of membrane deflection is indicative of the external pressure level.

10. A pressure sensor comprising:
    (a) a surface acoustical wave conductive body having an input transducer disposed to transmit a directional acoustical wave across at least a surface portion of the body;
    (b) at least one reflection transducer disposed to receive and reflect the acoustical wave back as a reflected signal, the reflection transducer comprising at least one conductive finger switching between an electrically floating state and an electrically grounded state;
    (c) a pressure transducer disposed adjacent to the surface acoustical wave conducting body, the pressure transducer comprising a flexible conductive membrane; a cavity sealed by the membrane at a preset internal reference pressure; and
    (d) the membrane deflecting responsive to a predetermined external pressure to electrically engage and ground the one conductive finger to modulate the signal reflected by the one conductive finger.

11. A pressure sensor according to claim 10, wherein the membrane deflects and electrically grounds the conductive finger when the external pressure is substantially greater than or equal to the preset internal membrane pressure.

12. A pressure sensor according to claim 10, wherein the membrane engages at least one conductive contact region of the sensor body in the deflected state, the contact region being electrically connected with the one conductive finger.

13. A pressure sensor according to claim 12, wherein the contact region comprises a raised mesa.

14. A pressure sensor according to claim 10, wherein the reflection transducer comprises a plurality of conductive fingers, at least one of the conductive fingers being in electrical engagement with a respective conductive contact region of the sensor body, the membrane engaging the contact region in the deflected state to ground the one conductive finger.

15. A pressure sensor according to claim 14, wherein a signal reflected from the one conductive finger is modulated to convey information operatively identifying the pressure sensor.

16. A method for sensing pressure comprising the steps:
    (a) transmitting an acoustical wave across at least a surface portion of a sensor body;
    (b) positioning a reflection transducer to intercept the acoustical wave and reflect a signal back;
    (c) positioning a pressure transducer adjacent to the sensor body, the pressure transducer comprising a flexible conductive membrane, a cavity sealed by the membrane at a preset internal reference pressure;
    (d) deflecting the membrane into electrically contacting engagement with the reflection transducer responsive to the presence of a predetermined external pressure level; and
    (e) modulating the signal reflected by the reflection transducer by electrical engagement between the reflection transducer and the deflected membrane.

17. A method according to claim 16, further comprising the step of utilizing a reflection transducer comprising a plurality of conductive fingers, and one of the fingers being selectively contacted by the deflecting membrane to modulate the signal reflected by the one conductive finger.

18. A method according to claim 16, further comprising the step of utilizing a reflection transducer comprising a plurality of conductive fingers, the membrane selectively contacting an alternative conductive finger depending upon a degree of deflection undergone by the membrane in response to the external pressure level.

19. A method according to claim 16, further comprising the step of utilizing a sensor body having a conductive contact region extending between the reflection transducer and the membrane in a deflected condition.

20. A method according to claim 16, further comprising the step of transmitting an input signal to the sensor body for initiating the transmission of the acoustical wave and receiving the modulated reflected signal from the reflection transducer.

* * * * *